United States Patent [19]

Readman et al.

[11] Patent Number: 4,578,946

[45] Date of Patent: Apr. 1, 1986

[54] HYDRAZINE FUEL CATALYTIC GAS GENERATOR AND INJECTOR THEREFOR

[75] Inventors: John Readman, Rockford; Brian G. Johnson, Cherry Valley, both of Ill.

[73] Assignee: Sundstrand Corporation, Rockford, Ill.

[21] Appl. No.: 651,624

[22] Filed: Sep. 17, 1984

[51] Int. Cl.$^4$ .............................................. F02C 3/20
[52] U.S. Cl. .................................. 60/39.462; 60/742
[58] Field of Search .................... 60/39.462, 740, 742, 60/200.1

[56] References Cited

U.S. PATENT DOCUMENTS

| | | | |
|---|---|---|---|
| 2,706,887 | 4/1955 | Groa | 60/39.462 |
| 3,147,592 | 9/1964 | Rose | 60/39.462 |
| 3,719,046 | 3/1973 | Sutherland et al. | 60/206 |
| 3,893,294 | 7/1975 | Bruun et al. | 60/39.462 |
| 4,027,476 | 6/1977 | Schmidt | 60/39.462 |
| 4,069,664 | 1/1978 | Ellion et al. | 60/258 |
| 4,324,096 | 4/1982 | Ellion | 60/200 |

*Primary Examiner*—Louis J. Casaregola
*Attorney, Agent, or Firm*—Wood, Dalton, Phillips, Mason & Rowe

[57] ABSTRACT

A single-piece thermally isolated multi-point injector for a hydrazine fuel catalytic gas generator having a series of integral feed tubes each with a fuel passage and with the fuel inlet ends thereof spaced apart for ease of manufacture and inspection and associated with a distribution manifold. The feed tubes are arranged in spaced-apart circular arrays to facilitate formation thereof from an investment casting or by radial electrochemical machining cuts. The fuel injector retains the thermal isolation features of a welded or brazed capillary tube injector, but eliminates leakage points encountered in such a structure. The outlet end of each feed tube has a porous member associated therewith to obtain a uniform flow path of hydrazine fuel in all directions onto a catalyst bed.

14 Claims, 6 Drawing Figures

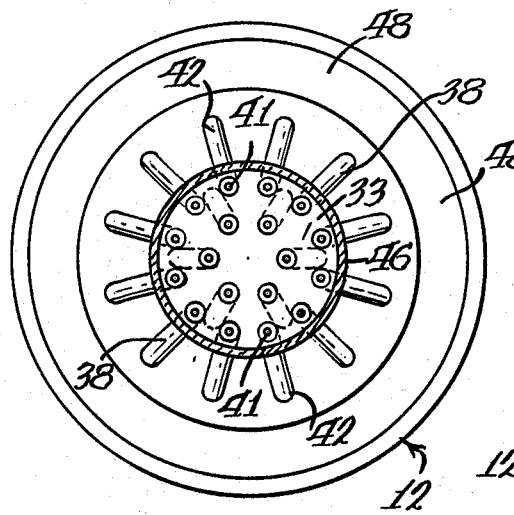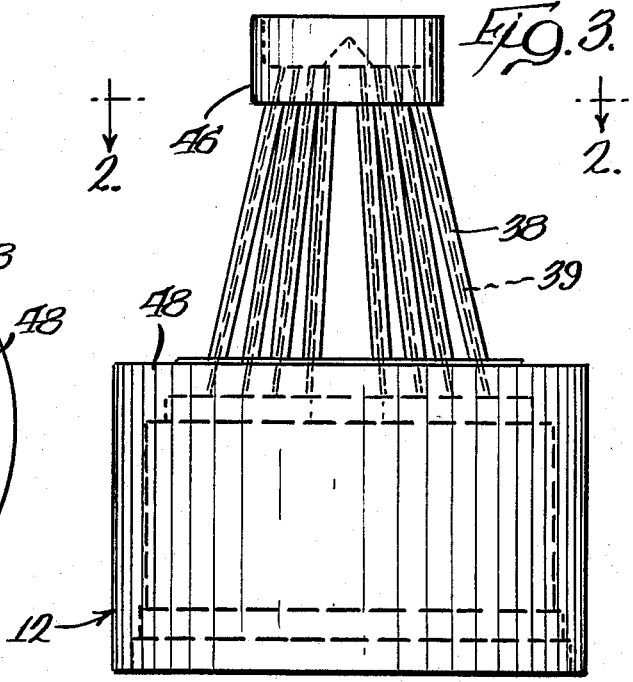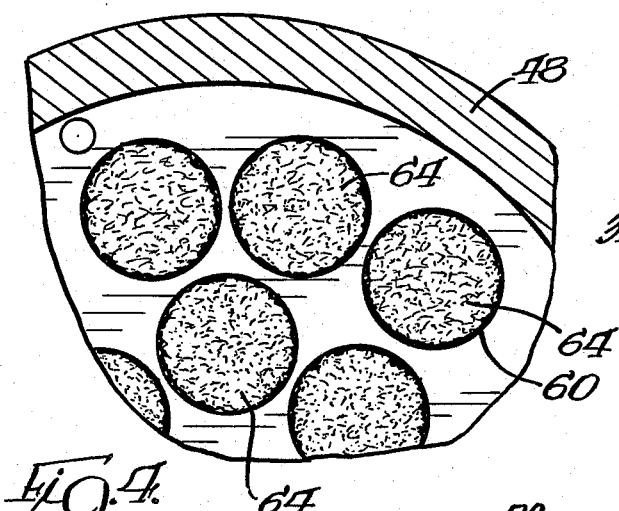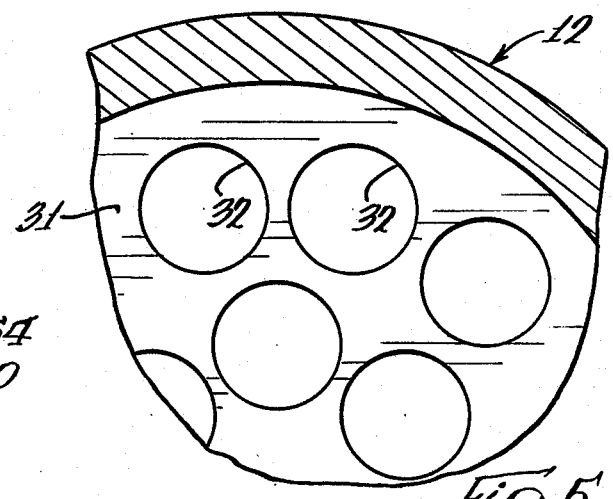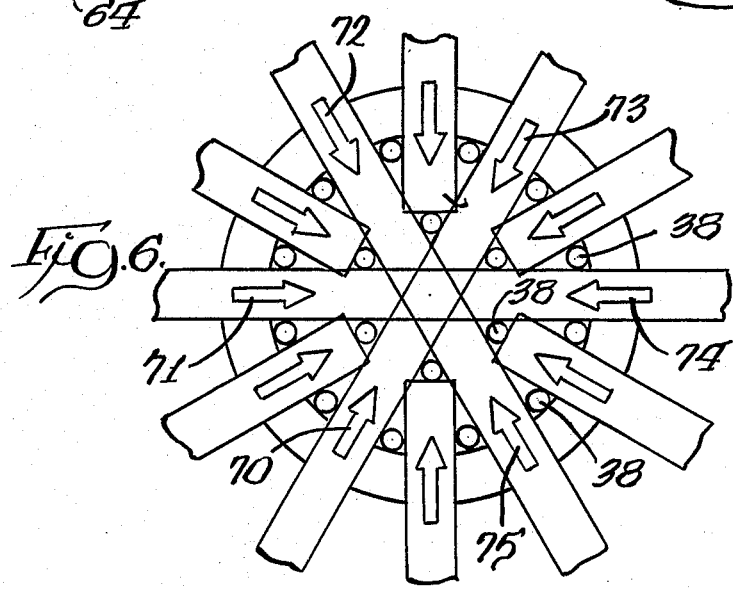

HYDRAZINE FUEL CATALYTIC GAS GENERATOR AND INJECTOR THEREFOR

DESCRIPTION

1. Technical Field

This invention pertains to a hydrazine fuel catalytic gas generator and more particularly to a single-piece, thermally isolated multi-point injector for use therein and the methods for making the injector. The injector delivers hydrazine fuel onto a catalyst with resulting generation of gas usable as a power source as for example in the drive of a gas turbine.

2. Background Art

The generation of gas by the decomposition of liquid hydrazine is well known in the art. The liquid hydrazine is brought into contact with a catalyst material which results in a decomposition of the liquid hydrazine into a hot gas which can be used directly to produce thrust or can be used to drive a gas turbine connected to a component to be driven such as a pump in a hydraulic power system for a missile.

The use of hydrazine fueled gas generators is disclosed in the Ellion U.S. Pat. Nos. 4,069,664 and 4,324,096. These patents describe the action in the decomposition of the liquid hydrazine and the gaseous products resulting therefrom and describe the nature of the catalyst giving a particular commercial example thereof.

A thermally isolated multi-point injector for use in a hydrazine fueled gas generator is normally constructed by welding or brazing capillary tubes to end plates. This results in a substantial number of tube to end plate joints equal to twice the number of capillary tubes. These joints are subject to flaws which allows hydrazine fuel leakage and possible fuel deterioration.

It has been proposed to machine a multi-point injector from a solid piece of material; however, such prior art structure has not been utilized in a thermally isolated injector structure and with the injector spaced from the catalyst onto which the hydrazine fuel is directed from the injector. It is important to have overall coverage of the catalyst bed by the injected hydrazine fuel by assuring that there is flow through all of the feed tubes of the injector and more particularly equal flow for equal distribution of the fuel onto the catalyst bed. The prior art single-piece multi-point fuel injector has not had a structure which enables visual inspection of the flow passages in the feed tubes and flow checking to verify equal distribution of the fuel.

DISCLOSURE OF THE INVENTION

A primary feature of the invention is to provide a single-piece thermally isolated multi-point injector for a hydrazine fuel catalytic gas generator with feed tubes arranged so that the fuel passages therein can be visually inspected and flow checked to verify that there will be equal distribution of the hydrazine liquid fuel onto a catalyst bed. In accordance with the foregoing, the feed tubes have spaced-apart inlet ends which are associated with an integral manifold which distributes the liquid hydrazine thereto. The separated feed tube inlet ends facilitate visual inspection of the fuel passages in the feed tubes and the use of flow checking structure to verify fluid flow.

Still another feature of the invention is to provide a single-piece, thermally isolated multi-point injector for a hydrazine fuel catalytic gas generator having a series of integral feed tubes in spaced-apart circular arrays which are either formed by means of an investment casting with cored fuel passages therein or passages drilled with electrochemical machining or are formed from a solid piece of material. The feed tubes are formed from a solid piece of material by repetitive radial electrochemical machining cuts and the fuel passages in the tubes are drilled with electrochemical machining. The feed tubes may diverge from their inlet ends to the outlet ends thereof and be formed from a solid piece of metal that is initially machined to a frusto-conical shape.

An object of the invention is to provide a single-piece thermally isolated multi-point hydrazine fuel injector for use in a hydrazine fuel catalytic gas generator having a catalyst chamber wherein the injector has a series of integral feed tubes each with a flow passage having inlet and outlet ends and the inlet ends being spaced apart and opening to a distribution manifold which enables separation of the inlet ends of the fuel passages.

Still another object of the invention is to provide a hydrazine fuel injector as defined in the preceding paragraph wherein the integral feed tubes are arranged in spaced circular arrays and structurally related one to the other to permit external formation thereof from a solid piece of frusto-conical material by a series of machining cuts radially of said solid piece.

A further object of the invention is to provide a hydrazine fuel injector as defined in the preceding paragraph wherein the machining cuts are performed by electrochemical machining.

An additional object of the invention is to provide a hydrazine fuel injector for a catalytic gas generator wherein a series of spaced-apart feed tubes each having a fuel passage are oriented with their outlet ends adjacent a catalyst bed and the inlet ends thereof are associated with a distribution manifold providing for distribution of hydrazine fuel to the inlet ends of the fuel passages and enabling separation of the fuel passages to facilitate visual inspection thereof as well as checking for fuel flow therethrough.

A further object of the invention is to provide a hydrazine fuel injector as defined in the preceding paragraph wherein a fuel disperser is associated with each feed tube at the outlet end thereof for even distribution of fuel over the catalyst bed.

BRIEF DESCRIPTION OF THE DRAWINGS

FIG. 2 is a section taken generally along the line 2—2 in FIG. 3;

FIG. 3 is an elevational view of a manifold housing and fuel injector removed from the gas generator shown in FIG. 1;

FIG. 4 is a fragmentary sectional view taken generally along the line 4—4 in FIG. 1;

FIG. 5 is a fragmentary sectional view taken generally along the line 5—5 in FIG. 1; and FIG. 6 is a diagrammatic view illustrating the machining process for the hydrazine fuel injector.

BEST MODES FOR CARRYING OUT THE INVENTION

Figure 1:
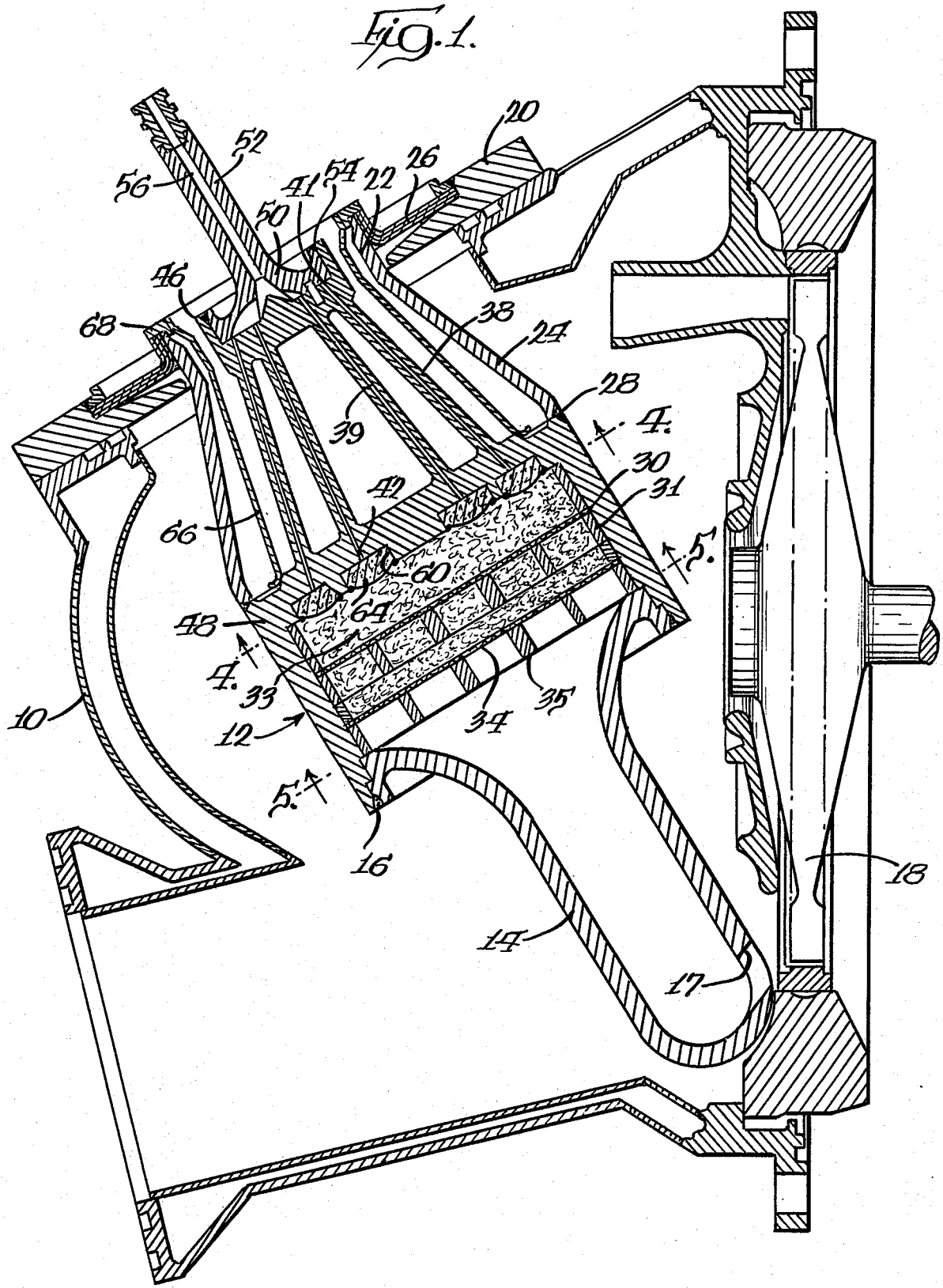
FIG. 1 is a central vertical section of a hydrazine fuel catalytic gas generator shown in association with a gas turbine.

The hydrazine fuel catalytic gas generator is shown generally in FIG. 1 wherein a casing 10 mounts a manifold housing 12 having a tubular nozzle 14 welded to one end thereof as shown at 16. The tubular nozzle 14 receives hot gas from the gas generator to be described and delivers this gas through a nozzle outlet 17 to a turbine wheel 18 of a gas turbine connected for driving a device such as a pump for supplying fluid under pressure to a fluid circuit. It will be obvious that the hot gas can be utilized for other purposes.

The casing 10 mounts a flange 20 with a central opening which receives a reduced diameter portion 22 of a conical outer housing 24 with sealing diaphragms 26 connected therebetween. The conical outer housing 24 is attached to the inlet manifold 12 by means such as the weld shown at 28.

The manifold housing 12 is shown particularly in FIGS. 2 and 3 and is generally cylindrical with a peripheral wall defining a hollow catalyst chamber which mounts a pair of spaced-apart screen and grid structures for holding catalyst. A first screen 30 is backed up by a grid 31 shown partially in FIG. 5 which has spaced cylindrical openings 32 therein. This supports a catalyst bed 33 in position for distribution of hydrazine fuel thereover as received from a single-piece thermally isolated multi-point injector to be described. A second screen 34 and grid 35 of a construction similar to the screen 30 and grid 31 supports additional catalyst.

The single-piece thermally isolated multi-point injector is shown particularly in FIGS. 1, 2 and 3 and comprises a series of feed tubes 38 each having a capillary fuel passage 39. Each of the feed tubes 38 has an inlet end 41 and an outlet end 42. As seen particularly in FIG. 2, the inlet ends 41 of the feed tubes are arranged in two radially spaced-apart circular arrays and with the feed tubes being integral through an upper connecting part 46 and a lower connecting part 48 which is part of the manifold housing 12.

The upper connecting part 46 has an upstanding peripheral wall providing a recess in which a distribution manifold 50 is positioned and which is integral with a central feed tube 52. The distribution manifold 50 is welded to the upper part 46 as shown at 54. The distribution manifold 50 has a concave lower wall coacting with the upper connecting part 46 to provide a chamber which receives hydrazine fuel delivered through a passage 56 of the central feed tube 52 and delivers hydrazine fuel to the inlet ends 41 of all of the feed tubes 38.

The lower connecting part 48 integral with the feed tubes has a series of cavities 60 associated one with each of the feed tubes in which a fuel disperser 64 is positioned. The fuel disperser may be a metallic or ceramic porous member. As shown, the fuel disperser is a metal foam having open cells to assure flow paths of uniform capacity for flow of hydrazine fuel in all directions onto the catalyst bed supported by the screen 30 and, as seen in FIG. 4, is welded to the lower connecting part 48.

A shroud 66 surrounds the injector feed tubes 38 in spaced relation thereto and extends between the lower connecting part 48 and a ring 68 associated with the outer housing 24.

The feed tubes are of a thin wall construction to limit transfer of heat upwardly thereof to the hydrazine fuel within the chamber at the distribution manifold 50.

It is important to have good coverage of the catalyst bed by the hydrazine fuel delivered through the feed tubes 38. The structural arrangement disclosed herein provides for separation of the inlet ends 41 of the feed tubes wherein the fuel passages therein may be visually inspected and each fuel passage can be flow checked by structure placed in association with each individual feed tube inlet end.

It is important to avoid the leakage of hydrazine fuel and the disclosed single piece multi-point injector accomplishes this result by the avoidance of the welding of feed tubes to end plates. The only critical weld is of the distribution manifold 50 to the wall of the upper connecting part 46 and the adequacy of this weld can be verified with conventional equipment.

One method of forming the integral feed tubes 38 is by use of a solid piece of a high temperature alloy (for example, HASTELLOY) which is initially shaped or machined to a frusto-conical shape. The feed tubes 38 are then formed by repetitive radial electrochemical machining cuts and the fuel passages 39 within the feed tubes 38 are drilled with electrochemical machining. This radial cutting is illustrated in FIG. 6 which shows the feed tubes 38 arranged in two spaced-apart circular arrays. Radial cuts to the center can be made in the direction of the arrows 70–75 and the remaining cuts can be made to a lesser depth as illustrated by the remaining arrows. The depth to which the cuts illustrated by the remaining arrows are made will vary along the height of the fuel injector since, as seen in FIG. 2, the inlet ends 41 of the feed tubes are closer together than the outlet ends 42 thereof as are the radially spaced circular arrays.

The feed passages 39 in the feed tubes can be made by electrochemical machining. The feed tubes can also be formed by electron discharge machining.

An alternative to initially forming a solid piece of metal to a frusto-conical outline followed by the electrochemical machining would be to form the integral feed tubes as an investment casting with cored fuel passages or passages drilled with electrochemical machining.

The hydrazine fuel injector disclosed herein is a single-piece unit that retains the thermal isolation features of a welded or brazed capillary tube injector and eliminates leakage points found in such prior structure.

A further improvement is the provision for feeding the fuel passages in the feed tubes from a distribution manifold providing for separation of the inlet ends of the fuel passages. The use of the distribution manifold retains the thermal isolation required, eases the machining of the fuel passages and allows each fuel passage to be visually inspected and flow checked to verify that there will be equal distribution of the hydrazine fuel onto the catalyst bed.

We claim:

1. A hydrazine fuel catalytic gas generator and injector therefor comprising, a distribution manifold, a catalyst chamber, and a single-piece multi-point fuel injector having upper and lower connecting parts with a series of integral feed tubes extending therebetween each with a flow passage having inlet and outlet ends, said integral feed tubes being arranged in a circular array and in diverging relation from said inlet ends to said outlet ends, said upper connecting part having a generally planar surface to coact with said distribution manifold, and said feed tube inlet ends all opening to said generally planar surface and in spaced-apart relation one to the other to enable visual inspection and flow checking of the flow passages.

2. A hydrazine fuel catalytic gas generator as defined in claim 1, including a porous foam member positioned at the outlet end of each feed tube to achieve a plurality of hydrazine fuel flow paths directed toward the catalyst chamber and which are of uniform flow capacity for spread of hydrazine over a catalyst bed in said catalyst chamber.

3. A hydrazine fuel catalytic gas generator as defined in claim 1 wherein said integral feed tubes are arranged in spaced circular arrays and structurally related one to the other to permit external formation thereof from a solid piece of material by a series of machining cuts radially of said circular arrays.

4. A hydrazine fuel catalytic gas generator as defined in claim 3 wherein said machining cuts are by electrochemical machining.

5. A hydrazine fuel catalytic gas generator as defined in claim 4 wherein said circular arrays and the feed tubes within an array diverge away from said distribution manifold and said machining cuts vary in depth.

6. A hydrazine fuel catalytic gas generator as defined in claim 4 wherein said feed tube flow passages are formed by electrochemical machining.

7. A hydrazine fuel catalytic gas generator as defined in claim 3 wherein said solid piece of metal has a frusto-conical shape prior to said electrochemical machining.

8. A hydrazine fuel catalytic gas generator as defined in claim 1 wherein said distribution manifold is welded to said single piece fuel injector.

9. A hydrazine fuel catalytic gas generator as defined in claim 1 including a tubular end member extending beyond said feed tube outlet ends, and screen and grid structure positioned therein for holding catalyst.

10. A hydrazine fuel catalytic gas generator having a catalyst chamber for supporting a catalyst bed, a series of diverging integral feed tubes extended between upper and lower connecting parts, said upper connecting part having a surface with a generally planar extent, said feed tubes each having an inlet end opening to the surface of said upper connecting part and said feed tubes being in two radially spaced-apart circular arrays whereby said inlet ends are separate and spaced one from the other at said surface of the upper connecting part, a distribution manifold associated with said upper connecting part for distributing hydrazine fuel to the inlet ends of said feed tubes, and a fuel disperser positioned at an outlet end of each feed tube and at a distance from the catalyst bed to uniformly distribute hydrazine fuel over the catalyst bed.

11. A hydrazine fuel catalytic gas generator as defined in claim 10 wherein said integral feed tubes are structurally related one to the other to permit external formation thereof from a solid piece of material by a series of machining cuts radially of said solid piece.

12. A hydrazine fuel catalytic gas generator as defined in claim 11 wherein the two circular arrays of feed tubes are inner and outer arrays and with their spacing enabling two feed tubes of the outer array and one feed tube of the inner array to be formed by two angularly-related radial machining cuts and one radial machining cut intermediate the other two and to a lesser depth.

13. A hydrazine fuel catalytic gas generator as defined in claim 10 wherein said distribution manifold is welded to said upper connecting part.

14. A hydrazine fuel catalytic gas generator as defined in claim 10 including screen and grid structure positioned in said catalyst chamber for support of said catalyst bed.

* * * * *